United States Patent [19]

Carre et al.

[11] Patent Number: 6,054,522
[45] Date of Patent: *Apr. 25, 2000

[54] COATING FOR IMPARTING NON-STICK, ABRASION RESISTANT AND NON-WETTING PROPERTIES TO INORGANIC ARTICLES

[75] Inventors: Alain Carre, Le Chatelet en Brie; Michel Prassas, Vulaines sur Seine; Jean Waku-Nsimba, Fontainebleau, all of France

[73] Assignee: Corning Incorporated, Corning, N.Y.

[ * ] Notice: This patent is subject to a terminal disclaimer.

[21] Appl. No.: 09/029,297

[22] PCT Filed: Sep. 17, 1996

[86] PCT No.: PCT/US96/14906

§ 371 Date: Mar. 5, 1998

§ 102(e) Date: Mar. 5, 1998

[87] PCT Pub. No.: WO97/13730

PCT Pub. Date: Apr. 17, 1997

Related U.S. Application Data

[60] Provisional application No. 60/007,705, Nov. 29, 1995.

[30] Foreign Application Priority Data

Sep. 28, 1995 [FR] France .................................. 95 11372

[51] Int. Cl.⁷ ..................................................... C08K 3/18
[52] U.S. Cl. .......................... 524/431; 524/430; 524/437; 524/783; 524/786; 524/837
[58] Field of Search ...................... 524/430, 431, 524/437, 783, 786, 837

[56] References Cited

U.S. PATENT DOCUMENTS 4,652,467  3/1987  Brinker et al. ........................... 427/246
5,175,027  12/1992  Holmes-Farley et al. ............... 427/387

FOREIGN PATENT DOCUMENTS 0 263 428  9/1987  European Pat. Off. .
0 513 727  5/1992  European Pat. Off. .
0 524 529  7/1992  European Pat. Off. .
0 548 775  12/1992  European Pat. Off. .
2 674 862  4/1991  France .
54-097617  8/1979  Japan .
5-319867  12/1993  Japan .

*Primary Examiner*—Melvyn I. Marquis
*Attorney, Agent, or Firm*—Milton M. Peterson; Anca C. Gheorghiu

[57] ABSTRACT

A protective coating which imparts non-stick and abrasion resistant properties, as well as hydrophobic properties to an inorganic article, the coating being the composition product between hydroxyl groups on the surface of the inorganic article and a composition comprising a silane, a metal alkoxide and an acidified aqueous mixture of a lower alkanol. The silane content is at least 50% of the total sum of the silane plus the metal alkoxide. The metal alkoxide is at least 5% and preferably 10% of the total sum of the silane plus the metal alkoxide.

8 Claims, 1 Drawing Sheet

COATING FOR IMPARTING NON-STICK, ABRASION RESISTANT AND NON-WETTING PROPERTIES TO INORGANIC ARTICLES

RELATED APPLICATION

An application entitled SYSTEMS FOR IMPARTING NON-STICK AND NON-WETTING PROPERTIES TO SURFACES, filed under Ser. No. 60/007,704 in the names of A. Carré, M. Prassas and J. Waku and assigned to the same assignee as this application, is directed to a material system and method for imparting non-stick and non-wetting properties to an inorganic article having hydroxyl groups on its surface, the system comprising a silane having the formula $R_nMX_{4-n}$ wherein n is 1 or 2 and X is a hydrolyzable group, a colloidal metal oxide sol, and an acidified aqueous mixture with a lower alkanol.

The present application claims the benefit of French Application 95 11373, filed Sep. 28, 1995 (28-09-1995), and of U.S. Provisional Application Ser. No. 60/007,705, express mailed Nov. 29, 1995, entitled SYSTEMS FOR IMPARTING NON-STICK AND NON-WETTING PROPERTIES TO SURFACES, by A. Carré, N. Prassas and J. Waku.

FIELD OF THE INVENTION

The field is a material system and a process for coating articles, particularly glass and glass-ceramic articles, to impart durable, non-stick and non-wetting properties

BACKGROUND OF THE INVENTION

Considerable effort has been directed at producing an effective, non-stick and non-wetting coating on the surface of an inorganic article, in particular a utensil for preparing and/or serving food. The term "non-stick" signifies a surface that resists adherence of foreign substances, such as food. This property permits easy cleaning of dishes in which foods are cooked or baked. The term "non-wetting" indicates a surface that repels liquids such as water. The property is evidenced by a large contact angle between a drop of water and the surface on which the drop rests. An advancing angle of at least 90° is considered as representative of a non-wettable surface.

Non-stick, non-wetting articles are commonly produced by coating article surfaces with a polytetrafluoroethylene (PTFE) layer. For example, U.S. Pat. No. 4,683,168 (Hares et al.) describes a process for coating glass or glass-ceramic articles with such a layer to produce non-stick cooking utensils. However, PTFE coatings exhibit the disadvantage of being opaque. Also, they require a thermal sintering process at 350°–400° C. for their production, are relatively expensive to produce, and do not provide a desired degree of abrasion resistance.

French Patent No. 2674862 (Carré) discloses an alternative material system and process for producing durable, non-stick and water repellent coatings on glass and glass-ceramic surfaces. The process involves applying a mixture of a selected silane with a lower alkanol and water which may be acidified. The silane has the formula $R_nSiX_{4-n}$, where R is an alkyl radical and X is a hydrolyzable alkoxy or chloro group. The mixture is applied to a surface containing hydroxyl groups, the silane is hydrolyzed and the alkanol-water mixture eliminated to form a polysiloxane coating adhering to the surface.

Numerous other processes and material systems have been proposed for rendering inorganic surfaces, particularly vitreous surfaces, non-sticking and water repellent. The desired properties can be obtained initially. However, there has persisted a problem with respect to wear during use, in particular, scratching by cleaning agents. It is, then, a purpose of the present invention to improve on the Carré process by imparting a greater abrasion resistance to the coating there disclosed

SUMMARY OF THE INVENTION

The present invention resides in part in a material system for imparting non-stick and non-wetting properties to an inorganic article having hydroxyl groups on its surface, the system comprising a silane having the formula $R_nSiX_{4-n}$ wherein n is 1–2 and X is a hydrolyzable group, a metal alkoxide having at least three hydrolyzable branches and a formula $R\ MX_3$ or $MX_4$ wherein M is a metal and X is a hydrolyzable branch, and an acidified aqueous mixture with a lower alkanol.

The invention further resides in a method of imparting non-stick and non-wetting properties to an inorganic article having hydroxyl groups on its surface which comprises mixing a silane having a formula $R_nSiX_{4-n}$, with a metal alkoxide having a formula $R\ MX_3$, or $MX_4$, adding an acidified aqueous mixture of a lower alkanol, applying a coating of the mixture to a surface on the inorganic article, thermally processing the coating at a temperature of at least 100° C. to form a solid, transparent film on the article surface

DESCRIPTION OF THE INVENTION

Figure 1:
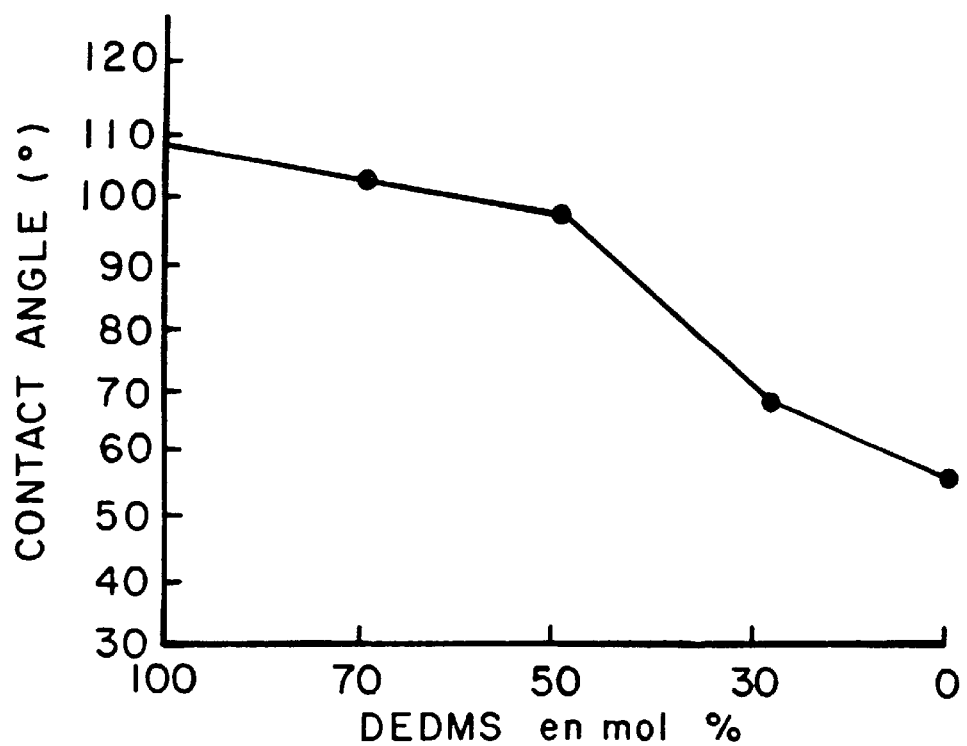
FIG. 1 A graphical illustration showing contact angle as a function of mol % of dethoxy dimethyl silane (DEDMS).

The present invention arose from studies directed at improving the polysiloxane, non-stick coating disclosed in French Patent No. 2674862 (Carré). The non-stick properties of the Carré coating are adequate. However the coating, like other known non-stick coatings, is prone to damage and removal. This is particularly true when the coating is subjected to the abrasion occasioned by normal scrubbing. Accordingly, efforts were directed at improving the abrasion-resistance of the known coating while either retaining, or improving on, its non-stick characteristics.

We have now found that the desired improvement can be achieved by incorporating a selected metal alkoxide with the prior silane component to achieve a hybrid coating. The coating retains the good non-stick and non-wetting characteristics of the prior polysiloxane coating. It adds substantially better thermal stability and resistance to detergent and abrasion treatment.

The new hybrid coating material, like the earlier silane coating material, is effective when applied to an inorganic article having hydroxyl groups on its surface, in particular, a glass or glass-ceramic article. The silane and the metal alkoxide are hydrolyzed to produce hydroxyl groups. These groups, produced during hydrolysis, link with the hydroxyl groups on the article surface to create a surface exhibiting hydrophobic properties.

The coating material represents a mixture of at least three components: (a) a silane having the formula $R_nSiX_{4-n}$, (b) a metal alkoxide having the formula $R\ MX_3$ or $MX_4$, and (c) a mixture of a lower alkanol and acidified water.

The silane having the formula $R_nSiX_{4-n}$ is a silane wherein each R is chosen independently from among the methyl, ethyl, and propyl radicals, unsubstituted or partially or totally substituted by fluorine atoms; X is a hydrolyzable group chosen from among the methoxy, ethoxy, and chloro groups; and n=1 or 2. A mixture of a lower alkanol and water is added to the silane constituent as a solvent. The water is preferably acidified, at least where X is a methoxy or ethoxy group.

Among the usable silanes encompassed within the above formula, it is preferred that R be a non-substituted lower alkyl-radical, the methyl group being the most preferred. The non-substituted silanes are preferred from a practical point of view. They are more economical than silanes containing fluorinated radicals.

The silane component can be formed exclusively of a silane having the above formula where n=2 or 1. It may also be a mixture of silanes having the above formula where n=2 and where n=1. In a mixture, the silane having the above formula where n=2 preferably constitutes at least 20 mole percent of the silane mixture. The most preferred silane of the above formula where n=2 is dimethyldiethoxysilane. The most preferred silane of the above formula where n=1 is methyltriethoxysilane.

The alkanol employed in the alkanol-water mixture can be a lower alkanol such as methanol, ethanol, or a propanol such as isopropanol. Ethanol or propanol is preferred, the choice depending on the method of application. The role of the alkanol is simply to permit the solution and/or the dispersion of the silane in the aqueous mixture, the silane not being soluble in water.

Where a non-chlorinated silane constituent is used, the alkanol-water mixture can conveniently contain 5–93% by volume water, preferably 5–60% by volume. In contrast, where a chlorinated silane component is employed, the proportion of water in the alkanol-water mixture can be reduced to a very small amount, i.e., to the order of trace amounts.

The water is acidified with a mineral or organic acid, for example, to reduce the pH below approximately 4 where an alkoxylated silane constituent is used. Examples of operable acids include hydrochloric acid, nitric acid, sulfuric acid, and acetic acid. When a chlorinated silane constituent is utilized, it is not always necessary to pre-acidify the water. It is acidified automatically as soon as the silane hydrolysis commences as a result of the formation of HCl.

The proportion of silane in the composition is not very critical. For example, it may be about 0.06–1 mole/liter, preferably about 0.1–0.6 mole/liter, of the mixture.

The metal alkoxide component of the coating mixture has a formula $R MX_3$ or $MX_4$. This provides an alkoxide with at least 3 hydrolyzable branches to increase cohesion and bonding of the components. This provides a thickened layer and increases the links with the inorganic surface to enhance the coating.

In the alkoxide formula, M is a metal, preferably selected from the group consisting of silicon, titanium, zirconium and aluminum. R, if present, may be a methyl, ethyl, propyl, or butyl group. In preparing a coating material, the mixture of alkanol and water is added to the silane as a solvent therefore. If needed to allow the silane to undergo hydrolysis, acid is then added. The mixture is continuously stirred to provide a homogeneous mixture. The metal alkoxide is then added while maintaining an inert, e.g. $N_2$, atmosphere. This is necessary because most alkoxides are quite moisture sensitive, even at ambient, and tend to undergo hydrolysis.

The coating material is now applied to the surface to be protected. The hydrolyzed X groups on the silane and alkoxide components can react by condensation with the hydroxyl groups present at an inorganic surface to form stable bonds with that surface. The overall result of these reactions is the formation of a thin, hybrid coating. This coating is durably bonded to the surface of the treated inorganic article and confers non-stick and water repellent properties to that surface. The inventive compositions for treating inorganic surfaces exhibit limited stability and, therefore, must be used within a reasonably short time of their preparation.

The reaction of the hydrolyzed groups with the hydroxyl groups on an inorganic surface can be carried out at ambient temperature. However, that reaction is rather slow (about 24 hours). The time required may be substantially shortened by a heat treatment, for example, about 80° C.

To complete densification, the coated article may be heated to a temperature of about 100°–400° C. for a period of time. This can be, for example, about 5–30 minutes, depending upon the particular composition used for the treatment and upon the temperature of heating.

One method of forming the protective coating comprises briefly dipping the article to be treated, while it is at an elevated temperature, e.g., 100°–300° C., into a bath of the inventive composition for a few seconds. The article is then permitted to cool naturally. The evaporation of the alkanol-water mixture and the condensation reactions take place during that cooling.

This mode of forming the desired coating is especially economical and convenient in operation for glass and glass-ceramic articles. The manufacturing of such articles customarily involves heating processes, e.g., in forming the article, or in annealing, tempering, ceramming, or other forms of thermal treatment. With such articles, the inventive process can be implemented in a production line. The article will be at a temperature sufficiently high to be suitable for carrying out the thermal treatment necessary for the formation of the coating.

Other methods of forming the protective coating involve painting, spinning, or spraying the coating material onto an unheated surface. The material is then heated at 100–300° C. for 5–30 minutes to remove volatiles and set the coating.

The coating obtained from the inventive compositions imparts non-stick, hydrophobic, and water repellent properties to the coated surface. These properties are surprisingly superior to those that can be obtained from prior compositions based upon silanes alone. In particular, the present coatings are much more resistant to detrimental effects from abrasives and detergents.

The nature of the protective coating, and its production, may be seen in the following projected formulations:

a. A glass or glass-ceramic surface containing hydroxyl groups.

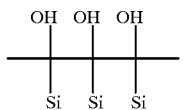

b. Hydrolysis of a hydrolyzable silane

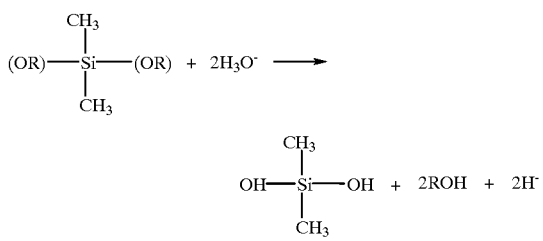

c. Hydrolysis of a metal alkoxide

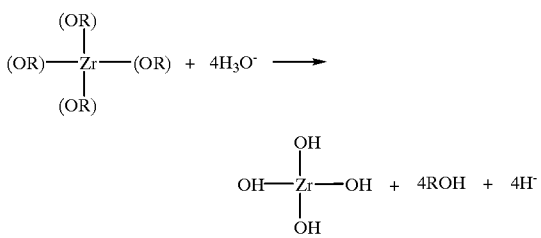

d. The coated, hydrophobic surface

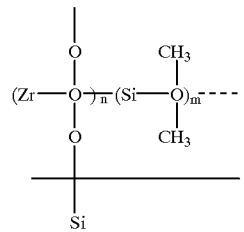

The hydroxyl groups produced by hydrolysis in (b) and (c) link with those on the article surface (a) to form a hydrophobic coating (d). This imparts hydrophobic properties to the surface.

The presence of acid in the coating material is necessary to permit hydrolysis of the silane and alkoxide. To this end, the ratio of acid to the sum of silane plus alkoxide should be at least 0.4, and preferably in the range of 0.6 to 5.2.

Silanes and metal alkoxides have different hydrolysis rates. A small amount of a known complexant molecule may be employed to control these rates. This achieves a desirable structure in the hydrolyzed coating and renders it clear and transparent. Diketonates, p-diketonates and carboxylic acids are among the complexants that may be used.

Choosing a ratio of silane to alkoxide in the coating material represents a compromise. The silane, as observed earlier, provides good non-stick properties. These are evidenced by high contact angles. However, the coating does not have good resistance to abrasion and detergent attack.

We have now found that the presence of certain metal alkoxides in a silane coating material markedly improves the abrasion and detergent resistance of a coating However, the metal alkoxide alone does not provide a coating having non-stick characteristics. Accordingly, it is necessary that the silane content in a coating material be at least equal to the metal alkoxide content. Preferably, the silane is in excess.

The effect is illustrated in FIG. 1 of the accompanying drawing That FIGURE is a graphical illustration wherein contact angle in degrees is plotted on the vertical axis. The mol percent of silane with respect to silane plus alkoxide is plotted on the horizontal axis. The silane was diethoxy dimethyl silane (DEDMS) and the alkoxide was zirconium (IV) propoxide (Zr[pro]$_4$) in mixtures employed to obtain the plotted data.

It will be observed that the contact angle falls off rapidly as the silane content becomes less than 50% of the total silane plus alkoxide. However, at least 5%, and preferably at least 10%, alkoxide is usually necessary to provide a substantial improvement in abrasion and detergent resistance.

Figure 2:
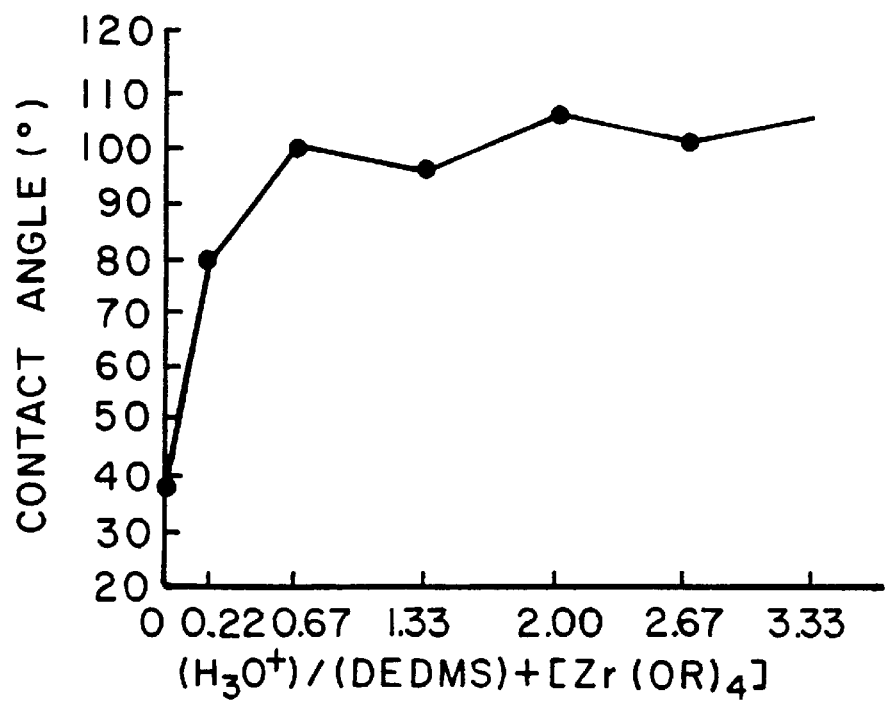
FIG. 2 A graphical illustration showing contact angle as a function of the ratio of acid to the sum of silane of FIG. 1 plus alkoxide.

The presence of an acid is necessary to permit hydrolysis of the silane and alkoxide. To this end, the ratio of acid to the sum of silane plus alkoxide should be at least 0.4 and preferably at least 0.6 and still more preferably at least 1.2 This is illustrated in FIG. 2 of the drawing. Again, contact angle, in degrees, is plotted on the vertical axis, while the ratio of acid to the sum of silane plus alkoxide is plotted on the horizontal axis.

It will be observed that the contact angle becomes insufficient as the ratio falls below about 0.4, but is reasonably stable at higher ratios. The acid is $HNO_3$ or HCl, the alkoxide is zirconium propoxide, and the silane is diethoxy dimethyl silane

SPECIFIC EMBODIMENTS

TABLE I sets forth a series of exemplary compositions that illustrate material systems in accordance with the invention. The silane employed in each composition was diethoxydimethyl silane (DEDMS). The alkanol selected was ethanol and the acids employed were 12M HCl and 15M $HNO_3$. Both are shown in moles/liter (mol/l).

The metal alkoxides were zirconium (IV) propoxide, shown as Zr(pro)$_4$; tetraisopropyl-orthotitanate, shown as TIOT; and aluminum-sec-butoxide, shown as Al(but)$_3$. Both the silane and alkoxide contents are shown in moles/liter (mol/l).

The several compositions were applied to a glass-ceramic surface by spinning. The coated samples were extensively tested for contact angle against water after various treatments. Measurements were made on test pieces after (1) an initial thermal treatment at 120° C. for one hour to set the coating (θ), (2) after being held at 360° C. for 30 minutes (360°/30); (3) after 30 minutes at 450° C. (450°/30); (4) after exposure to a detergent, Super Soilax®, for 8 hours at 95° C. (DT).

TABLE I

| Component | 1 | 2 | 3 | 4 | 5 | 6 |
| --- | --- | --- | --- | --- | --- | --- |
| DEDMS (mol/l) | 0.4 | 0.4 | 0.4 | 0.4 | 0.4 | 0.4 |
| Zr(pro)$_4$ (mol/l) | 0.3 | 0.3 | 0.3 | 0.3 | 0.3 | 0.3 |
| HCl (mol/l) | 0.9 | 1.2 | 1.5 | — | — | — |
| HNO$_3$ (mol/l) | — | — | — | 1.2 | 1.5 | 1.9 |
| ethanol (mol/l) | 12.8 | 12.5 | 12.2 | 12.8 | 12.5 | 12.2 |
| θ | 96 | 100 | 91 | 103 | 99 | 90 |
| 360°/30 | 96 | 96 | 91 | 96 | 90 | 90 |
| 450°/30 | 96 | 94 | 91 | 86 | 80 | 70 |
| DT | 88 | 78 | 82 | 98 | 80 | 73 |

| Component | 7 | 8 | 9 | 10 | 11 | 12 |
| --- | --- | --- | --- | --- | --- | --- |
| DEDMS (mol/l) | 0.4 | 0.4 | 0.4 | 0.4 | 0.4 | 0.4 |
| Zr(pro)$_4$ (mol/l) | — | — | — | — | 0.14 | 0.1 |
| TIOT (mol/l) | 0.2 | 0.2 | 0.2 | 0.2 | 0.2 | 0.133 |
| Al(but)$_3$ (mol/l) | — | — | — | — | — | 0.133 |
| HCl (mol/l) | 1.0 | 1.5 | — | — | — | — |
| HNO$_3$ (mol/l) | — | — | 1.2 | 1.5 | 1.9 | 1.9 |
| ethanol (mol/l) | 13.6 | 13.2 | 12.9 | 13.2 | 12.9 | 12.9 |

TABLE I-continued

| θ | | | | | | |
|---|---|---|---|---|---|---|
| 0 | 93 | 90 | 98 | 92 | 97 | 100 |
| 360°/30 | 86 | 90 | 75 | 65 | 80 | 97 |
| 450°/30 | 50 | 90 | 62 | 63 | 36 | 42 |
| DT | 86 | 90 | 90 | 70 | 83 | 85 |

Compositions 1, 4 5 and 6 are preferred because of their stability, the constancy of their performance under various conditions and ability to withstand thermal processing Composition 4 was subjected to various punishing treatments after being applied to commercial glass-ceramic articles having a lithium aluminosilicate (beta-spodumene) crystal phase.

Each coated article was evaluated for food release using a scale of 0–5 with 5 indicating excellent release and 0 indicating no release. The results were

| Treatment | θ | Food Release |
|---|---|---|
| Uncoated | 35 | 0 |
| Coated | 103 | 5 |
| Detergent 8 hours/95° C. | 98 | 4 |
| 4% Acetic acid 48 hours/95° C. | 75 | 4 |

A coated article, otherwise untreated, was subjected to a scrubbing action with a commercial cleansing pad. After 100 rotations at a pressure of 0.25 Kg/cm$^2$ (3.5 lbs/inch$^2$), food release was considered good, after a thousand rotations, release was still considered adequate.

EXAMPLE 13

The following material composition, also in mol/l, illustrates use of acetic acid as a complexant and of 2-propanol as a solvent:

| Component | Content |
|---|---|
| DEDMS | 0.64 |
| Zr(pro)$_4$ | 0.44 |
| HNO$_3$ | 2.16 |
| H$_2$O | 3.33 |
| Acetic acid | 0.03 |
| 2-propanol | 2.20 |

A mixture of these components was prepared and applied to a glass-ceramic surface by spraying. The sprayed article was cured for 30 minutes at 250° C. Surface finish, food release and durability were found to be excellent. The non-stick properties were not affected by either heat treatment at 360° C. for 30 minutes or by exposure to Super Soilax at 95° C. for 8 hours.

EXAMPLE 14

The following material composition, expressed in mol/l, illustrates the use of dimethyl dichlorosilane.

| Ingredient | Content |
|---|---|
| DMDCS* | 0.33 |
| Zr(pro)$_6$ | 0.06 |
| H$_2$O | 0.33 |
| Acetic acid | 0.02 |
| Alkanol | 15.90 |

*dimethyl dichlorosilane

A mixture of these ingredients has been prepared and coated on a glass-ceramic surface by spinning. After a curing of 250° C. for 30 minutes, the contact angle was 116°.

We claim:

1. A protective coating for an inorganic article provides improved resistance to abrasion, resists adhesion to foods and is hydrophobic, the coating being the condensation product between hydroxyl groups on the surface of the inorganic article and a composition comprising the following components:
   (a) a silane having the formula $R_nSiX_{4-n}$, wherein
      each R is chosen independently from the group consisting of methyl radical, ethyl radical, or propyl radical, unsubstituted or partially or totally substituted by fluorine atoms;
      X is a hydrolyzable group chosen from the group consisting of methoxy, ethoxy and chloro groups; and,
      n=1 or 2;
   (b) a metal alkoxide having at least three hydrolyzable branches and a formula R MX$_3$ or MX$_4$, wherein
      R is selected from the group consisting of methyl group, ethyl group, propyl group, and butyl group,
      M is a metal selected from the group consisting of silicon, titanium, zirconium and aluminum, and,
      X is a hydrolyzable group selected from the group consisting of methoxy, ethoxy and chloro groups; and,
   (c) a mixture of lower alkanol and acidified water, the water being acidified at least in cases where X is a methoxy or ethoxy group; wherein
      (i) the silane content is at least 50 mole % of the total sum of the silane plus the metal alkoxide;
      (ii) the metal alkoxide is at least 10 mole % of the total sum of the silane plus the metal alkoxide.

2. The protective coating of claim 1 wherein the metal alkoxide is zirconium propoxide.

3. The protective coating of claim 1 wherein the inorganic article is a glass or glass-ceramic.

4. The protective coating of claim 1 wherein the silane is diethoxy dimethyl silane.

5. The protective coating of claim 1 wherein the lower alkanol is ethanol.

6. A method of imparting non-stick and non-wetting properties, and improved abrasion resistance, to an inorganic article having hydroxyl groups on its surface, the method comprising the following steps:
   (1) making a mixture of a silane having a formula $R_nSiX_{4-n}$, with a metal alkoxide having a formula R MX$_3$ or MX$_4$,
   wherein in the silane
      each R is selected independently from the group consisting of methyl radical, ethyl radical, or propyl radical, unsubstituted or partially or totally substituted by fluorine atoms;
      X is a hydrolyzable group selected from the group consisting of methoxy, ethoxy and chloro groups; and, n=1 or 2, wherein in the metal alkoxide R is selected from the group consisting of methyl group, ethyl group, propyl group, and butyl group, M is a metal selected from the group consisting of silicon, titanium, zirconium and aluminum, and, X is a hydrolyzable group selected from the group consisting of methoxy, ethoxy and chloro groups;

wherein
(i) the silane content is at least 50 mole % of the total sum of the silane plus the metal alkoxide;
(ii) the metal alkoxide is at least 10 mole % of the total sum of the silane plus the metal alkoxide;

(2) adding an acidified aqueous mixture of a lower alkanol to hydrolyze the silane/metal alkoxide mixture, the water being acidified at least in cases where X is a methoxy or ethoxy group;

(3) applying a coating of the hydrolyzed mixture the surface of the inorganic article, the surface containing hydroxyl groups, (4) eliminating the alkanol-water mixture and allowing or causing a condensation reaction to take place between the product of the hydrolysis of silane and metal alkoxide components with the hydroxyl groups on the surface of the inorganic article to form a coating which is bonded to the surface of the inorganic article.

7. The method of claim 6 wherein the coating is applied by first heating the inorganic article at a temperature of 100–300° C. and then dipping the heated article in the mixture.

8. The method of claim 6 wherein the condensation reaction is caused by thermally processing the coating on the inorganic article at a temperature of 100–400° C. for 5–30 minutes.

* * * * *